United States Patent [19]

Campbell et al.

[11] 4,306,572
[45] Dec. 22, 1981

[54] AXIAL FLOW STRIPPER PLATE

[75] Inventors: Steven J. Campbell, New Holland, Pa.; Marc Christenson, Boring, Oreg.; Edward A. Relf, Queensland, Australia

[73] Assignee: Sperry Corporation, New Holland, Pa.

[21] Appl. No.: 171,855

[22] Filed: Jul. 24, 1980

[51] Int. Cl.³ ............................................ A01F 12/18
[52] U.S. Cl. .................................................. 130/27 T
[58] Field of Search .......................... 130/27 T, 27 R; 56/14.6

[56] References Cited

U.S. PATENT DOCUMENTS

| | | | |
|---|---|---|---|
| 3,464,419 | 9/1969 | Knapp et al. | 130/27 T |
| 3,626,472 | 12/1971 | Rowland-Hill | 130/27 T |
| 3,742,686 | 7/1973 | Rowland-Hill | 130/27 T |
| 3,827,443 | 8/1974 | Drayer | 130/27 T |
| 3,828,794 | 8/1974 | Gochanour | 130/27 T |
| 3,995,645 | 12/1976 | Rowland-Hill | 130/27 T |
| 4,250,896 | 2/1981 | Wagstaff et al. | 130/27 T |

Primary Examiner—Jay N. Eskovitz
Attorney, Agent, or Firm—James R. Bell; Frank A. Seemar

[57] ABSTRACT

In a crop harvesting and threshing machine of the type utilizing at least one axial flow threshing and separating rotor with auger flighting attached to the forward end thereof and mounted within a generally cylindrical elongate rotor casing having an inner sidewall and an opposing outer sidewall there is provided an elongate inwardly projecting stripper plate attached to the outer sidewall and cooperative with the auger flighting as the rotor rotates to force crop material rearwardly and to prevent the stems of the crop material from moving initially upwardly toward the top of the rotor casing and thereby preventing a wrapping about the rotor shaft.

6 Claims, 4 Drawing Figures

AXIAL FLOW STRIPPER PLATE

BACKGROUND OF THE INVENTION

This invention relates generally to crop harvesting and threshing machines, more commonly known as combines, and more particularly to the type of machine commonly referred to as an axial flow type of combine wherein the crop material passes axially through an elongate casing and about the threshing and separating rotor contained therein. More particularly, the invention is concerned with improved crop material guide means to prevent crop material from moving initially upwardly toward the top of the casing to help prevent its wrapping on the front shaft of the rotor adjacent the material infeed area of the casing. Specifically, the guide means comprises an elongate stripper plate attached to the outer sidewall of the casing which is tapered to cooperatively interact with auger flighting mounted to the front of the rotor to guide the crop material as just described. This invention is equally applicable to an axial flow type of combine utilizing either a single threshing and separating rotor or multiple threshing and separating rotors.

The conventional type of combines previously used pass the crop material to be threshed between a rotary cylinder and a stationary concave in a direction that is normal to the axis of the rotating cylinder and parallel with the longitudinal axis of the combine frame. In this system much of the grain contained in the crop material fed to the cylinder and the concave passes through the concave as threshed grain. The remainder of the material is conveyed to separating elements of the combine that traditionally include reciprocating or oscillating straw walkers, grain pans, and chaffer sieves. These conventional combines suffer from the major disadvantage of having a threshing capacity that is limited by the single pass of the crop material about the threshing cylinder. Combines of the axial flow type, in contrast, utilize single or dual threshing and separating rotors that permit the crop material to pass over the concave during the threshing process three or more times. The rotors may be mounted either parallel or transverse to the longitudinal axis of the combine. This increased exposure to either the transversely or longitudinally mounted rotors during the threshing process permits these axial flow type of combines to increase the amount of threshed grain obtained from any crop passed therethrough when compared with conventional combines.

A feeder housing elevator on the front of the axial flow type of combine delivers the cut crop material to the front or infeed end of the threshing and separating rotors. In one variation of the type of combine in which the instant invention can be utilized there are two rotors of generally cylindrical configuration which have a short infeed auger with flightings mounted to each of their forward ends. The rotors turn in opposite directions in parallel generally cylindrical housings or casings within a combined rotor casing and have separate threshing and separating portions. The threshing portion of each rotor or threshing cylinder has as many as four rasp bars fastened thereto in closely mounted pairs. Open type of concaves are individually adjustable and sit beneath each rotor within the casing. The separating portion of the rotors have separator blades fixed to each of the two rotors to continue separating the grain from the crop material as the material moves rearwardly. The rearward movement of the crop material is aided by arcuate fins fixed to the upper portions of the rotor casing. At the rear of the rotors crop material is deflected into a transverse discharge beater and an auxiliary separating area which serve to remove the remaining grain and expel the crop material residue at the rear of the combine. These features are all shown in greater detail in prior U.S. Pat. Nos. 3,626,472, issued Dec. 7, 1971, and 3,742,686, issued July 3, 1973, both to Rowland-Hill.

When axial flow type of combines are used in certain long stemmed leguminous or grassy crops, such as windrowed perennial or annual rye grass, clover and bent grass, there is the potential for the crop material to wrap about the shafts on the front of the threshing and separating rotors, especially when the stems are tough. These long stems are characteristically tough in the early morning until the sun has had ample opportunity to dry out the moisture which accumulates overnight. Should such crop material pass over the tops of these rotor shafts, it could become tightly wrapped about the shafts so as to impair the operational characteristics of the overall machine. This operational impairment from the wrapping potentially could cause eventual damage to the operating components of the rotors by breaking the seals to the rotor bearings, cause engine stallouts by binding the rotors so tightly that they cannot run, or, at the least, prove to be extremely difficult to untwine or disentangle.

Prior axial flow type of combines have recognized the problem that this wrapping can cause. One approach which has been taken to solve this problem involves the use of a casting that surrounds the rotor shaft and serves as a bearing housing as well as a shield for the bearing. The casting forms a central hub from which a shed bar projects radially outwardly in the form of a lobe to guide the crop material outwardly from the rotor shaft. The inherent disadvantages of this design include the relatively massive size of the shed bar, the relatively high cost of the casting and the associated shed bar and the fact that this casting/shed bar combination has the potential to build up a substantial amount of heat under tough crop conditions due to its size and the constant frictional contact of the crop material with it.

The foregoing problems are solved in the design of the machine comprising the present invention by preventing the crop material from moving initially upwardly toward the top of the casing and concurrently guiding it rearwardly to thereby prevent the crop material from passing over the top of the rotor shaft and wrapping thereabout.

SUMMARY OF THE INVENTION

It is a principal object of the present invention to provide in a combine of the axial flow type crop material guide means attached to the outer sidewall of the threshing and separating rotor casing adjacent the infeed area to prevent long stemmed crop material from initially moving upwardly towards the top of the rotor casing to thereby prevent its wrapping on the front of the rotor shaft by conveying the incoming crop material rearwardly before the material passes over the top of the rotor shaft.

It is a further object of the present invention to provide a simple, low cost mechanism that will preclude damage from occurring to the operating components of the threshing and separating rotors in an axial flow type of combine by preventing crop material from becoming wrapped about the rotating shaft at the front of the threshing and separating rotor.

It is a feature of the present invention that there is provided a tapered stripping plate which is affixed to the outer sidewall of the rotor casing adjacent the infeed area which cooperatively interacts with the rotor infeed auger to help convey the crop material further back into the rotor for threshing and separating.

It is another feature of the instant invention that the guide means or tapered stripper plate is tapered so that its inwardly projecting edge is contoured to conform with the path of travel of the periphery of the auger flighting in a proximate but non-interfering manner as the rotor is rotated.

It is a further feature of this invention that the stripping plate is positioned on the outer sidewall of the rotor casing at approximately a 45° angle to the horizontal to obtain sufficient rearward force to convey crop material rearwardly.

It is an advantage of the present invention that little or no crop material passes over the rotor shaft during the infeed of material thereby making it less likely for material to wrap around the shaft.

It is another advantage of this invention that the stripping plate serves to hold the ends of the stems down at the very front of the threshing and separating rotor to prevent the stems from riding up and about the end of the rotor shaft.

It is another advantage of the present invention that the stripping plate is especially effective in moist, long-stemmed crops, such as windrowed perennial grass, annual rye grass, clover, trefoil and bent grass which are harvested for seeds.

These and other objects, features and advantages are obtained by providing in a crop harvesting and threshing machine of the type utilizing at least one axial flow threshing and separating rotor within a generally cylindrical elongate rotor casing with an inner sidewall and an opposing outer sidewall an elongate inwardly projecting stripper plate attached to the outer sidewall and cooperative with the auger flighting as the rotor rotates to force crop material rearwardly and to prevent the stems of the crop material from moving initially upwardly toward the top of the rotor casing and thereby preventing their wrapping about the rotor shaft.

BRIEF DESCRIPTION OF THE DRAWINGS

The advantages of this invention will become apparent upon consideration of the following detailed disclosure of the invention, especially when it is taken in conjunction with the accompanying drawings wherein.

DETAILED DESCRIPTION OF THE PREFERRED EMBODIMENT

Figure 1:
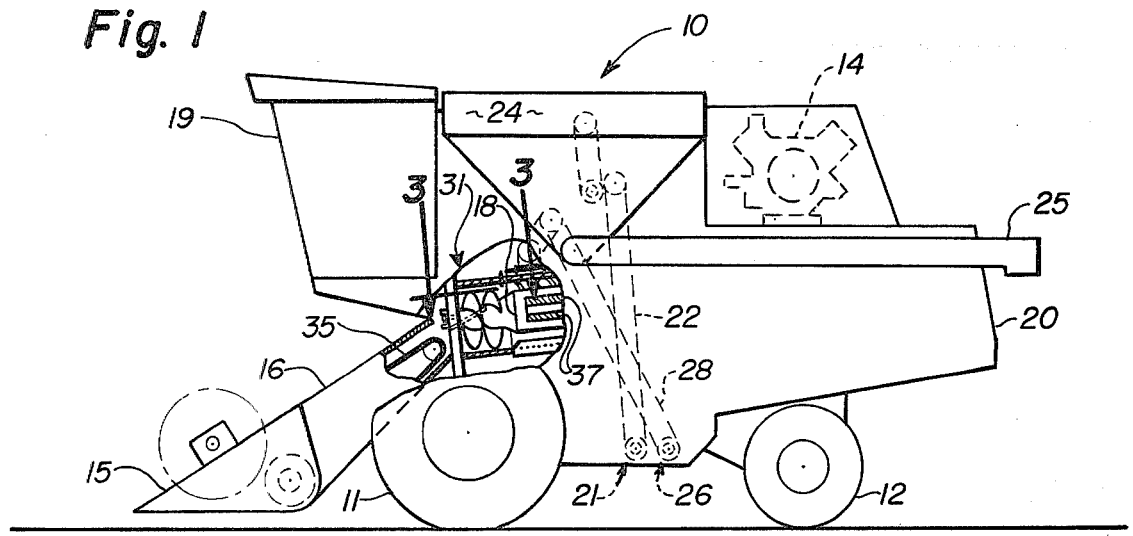
FIG. 1 is a side elevational view of a crop harvesting and threshing machine with a portion broken away to show in section the infeed area of the threshing and separating rotors.

Referring to FIG. 1 there is shown a combine 10 in a side elevational view with the area of the instant invention illustrated in fragmentary manner by having the side coverings cut away and further illustrated in a partially sectional view. As can be seen, the combine 10 has a mobile frame mounted to a pair of primary driving wheels 11 in the front and a pair of smaller steerable wheels 12 in the rear. The combine is powered by an engine 14, usually a diesel engine of relatively high horsepower. The engine 14 is mounted to the upper portion of the combine in a suitable fashion and, by means of drive belts or sprocket chains, is drivingly connected to the operational components of a combine.

The combine 10 has a header 15 and an infeed housing 16 mounted at its front. Combine 10 has a main frame or housing (not shown) that internally supports the two threshing and separating rotors 18, only one of which is partially shown in FIG. 1. The operator's cab 19 extends forwardly over the front of the combine 10 and is atop the infeed housing 16. A rear housing 20 encloses the rear of the combine 10 and covers the discharge beater and discharge grate assembly, both of which are not shown.

The main frame also supports a grain pan and grain cleaning means, both of which are not shown. The grain pan collects the threshed and cleaned grain and transports it to a grain trough, indicated generally in FIG. 1 by the numeral 21, which spans the width of the combine along the bottom of the frame. The trough is open-topped and has an auger (not shown) rotatably mounted therein which conveys the clean grain to the grain transfer chute, indicated generally by the numeral 22, which conveys the grain generally vertically upwardly into the grain tank 24 for storage. When it is necessary to unload the full grain tank, an unloading auger (not shown) is pivotaly mounted within an unloading auger tube 25 which is movable between inboard and outboard positions with respect to the longitudinal axis of a combine and is effective to discharge the threshed and cleaned grain from the grain tank to a receiving vehicle or container. FIG. 1 also shows a tailings collection trough, indicated generally by the numeral 26, which has an auger (not shown) mounted within spanning the width of the underside of the combine frame. The cleaning system within the combine is functional to take unthreshed grain which remains within the crop material, separate it from the clean grain and the chaff and direct it into this tailings trough 26. The tailings auger (not shown) then conveys the crop material with the unthreshed grain to a tailings return chute 28. Chute 28 extends generally upwardly from trough 26 where it connects with other apparatus to recycle the tailings into the threshing and separating rotors 18 in the conventional manner which is well known to those skilled in the art.

Figure 3:
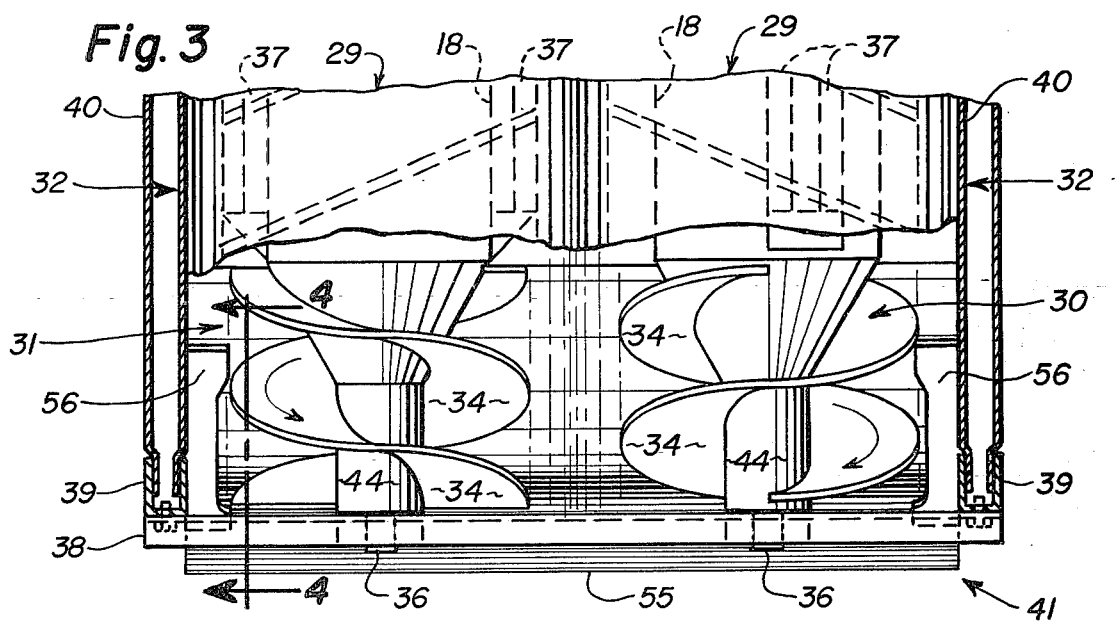
FIG. 3 is a top plan view of the rotor casings showing the positional relationship between the infeed auger flighting and the stripper plate taken along section line 3—3 of FIG. 1.

Both of the rotors 18 are enclosed in the individual elongate and generally cylindrical rotor casings partially illustrated in FIG. 3. Both the rotors 18 and the casing 29 are divided into infeed areas, indicated generally by the numerals 30 and 31, respectively, threshing areas, partially illustrated in FIG. 3 and indicated generally by the numeral 32 and separating areas (not shown). The infeed area 31 is in the forward portion of the rotor casing 29 adjacent the infeed housing 16, briefly seen in FIG. 1. The rotors 18 have a pair of auger flightings 34 spirally mounted thereabout in the rotor infeed area 30. The auger flightings 34 serve to deliver the stream of crop material brought from the header 15 through the infeed housing 16 by a crop elevator 35 rearwardly into contact with rasp bars 37 that are fastened to and generally define the threshing portions of the rotors 18. The rasp bars 37 are partially shown in FIG. 1. The auger flightings 34 may have auger flighting extensions and wear plates (both of which are not shown) bolted or otherwise appropriately fastened to the flighting's leading edges. These extensions and wear plates selectively increase the aggressiveness of the rotors 18 in the infeed area 30 and decrease wear to the fixed auger flightings 34 since they are detachable from the leading edges of the flighting. The rasp bars 37 cooperatively interact with the concaves (not shown), which are mounted generally beneath each of the cylindrically shaped rotors 18 in the lower portions of the elongated rotor casings 29, to receive and thresh the crop material spiralled rearwardly through the infeed area 31 by the auger flightings 34. The concaves are generally of the open type and concave in shape to permit shelled or threshed crop material to pass therethrough. The shelled or threshed crop material is then received upon the previously mentioned grain pan (not shown), which functions in a conventional manner to permit the grain or other crop material to be sifted and then collected in the clean grain trough 21 for ultimate transfer to the grain tank 24.

The structure thus far has been described generally since it is old and well known in the art. This structure and the interrelationships between the various operating components of the combine are described in greater detail in U.S. Pat. Nos. 3,626,472, issued Dec. 7, 1971; 3,742,686, issued July 3, 1973; and 3,995,645, issued Dec. 7, 1976; all to Rowland-Hill, hereinafter specifically incorporated by reference in their entirety, insofar as they are consistent with the instant disclosure.

Figure 2:
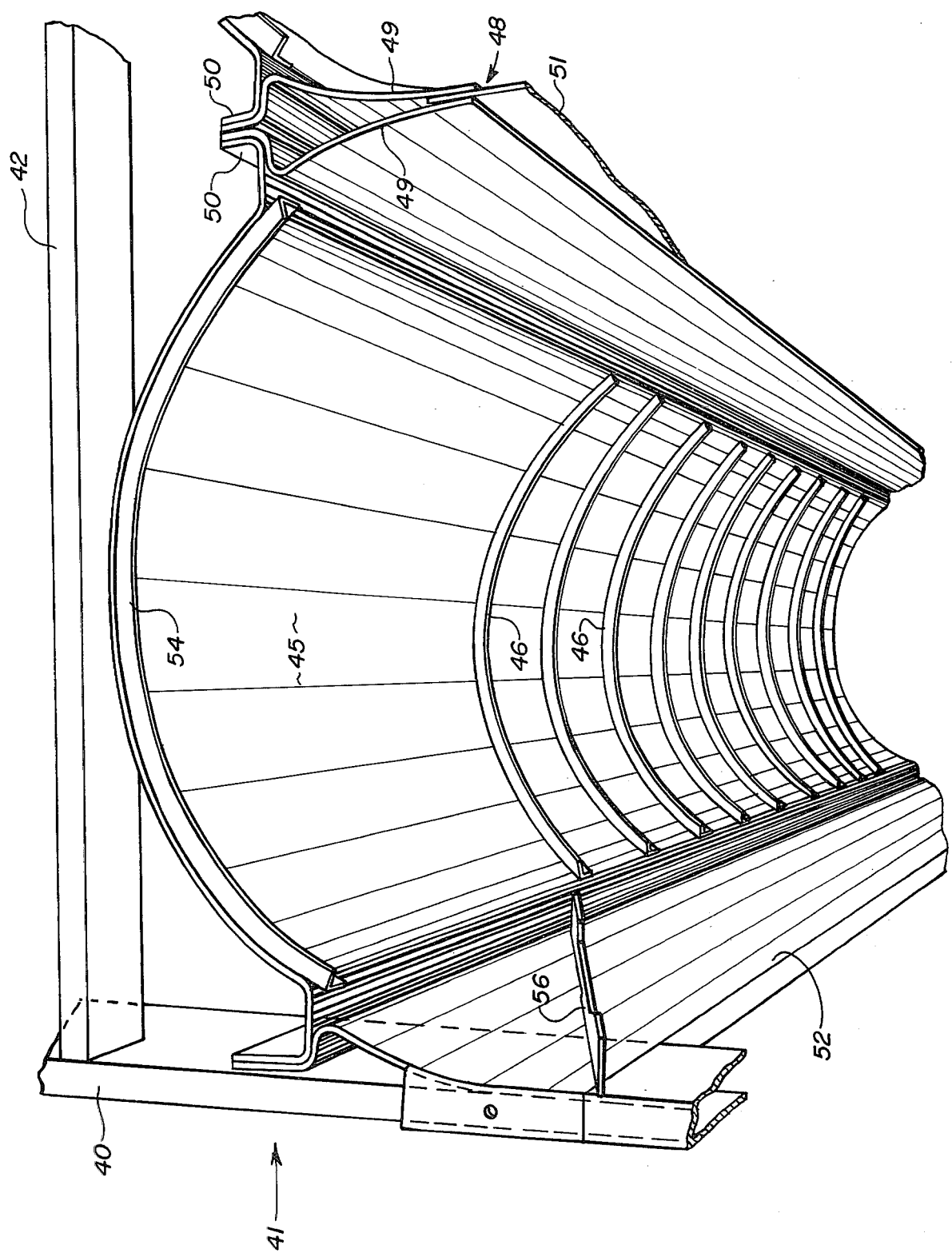
FIG. 2 is a front perspective of one rotor casing with the threshing and separating rotor removed showing the stripping plate mounted to the outer sidewall of the rotor casing.

The rotors 18 are mounted to a pair of stub shafts at their forward and rear ends. The stub shaft at the forward end of each rotor is indicated by the numeral 36 in FIG. 3. The rotors 18 are journalled via their stub shafts within a support member 38 in FIGS. 3 and 4. The support member 38 extends transversely across the front of the infeed area 31. Via mounting bracket 39 support member 38 is suitably fastened, such as by bolts, to the side channels 40 of the rotor casing module, indicated generally by the numeral 41 and best seen in FIGS. 2 and 3. Module 41 essentially comprises the supporting framework and the two elongated, generally cylindrical rotor casings 29. As seen in FIG. 2, the module 41 has channel member 42 and a corresponding channel member (not shown) at the rear transversely supporting the framework. As best seen in FIG. 3, each stub shaft 36 is fastened to the rotor 18 in the rotor's generally cylindrical portion 44 which is in the infeed area 30 of the rotor. Stub shaft 36 has a bearing housing (not shown) which surrounds it and a bearing collar (also not shown) immediately forwardly thereof.

The individual rotor casings 29 have previously been described as elongate and generally cylindrical in shape. FIG. 2 shows how the roof 45 of each of the rotor casings 29 has a generally cylindrical form within the rotor casing module 41. A series of truncated arcuate transport fins 46 are affixed to the roof 45 to aid in the rearward spiral movement of the crop material through the casing 29 and about each of the rotors 18. The fins 46 may be either in the form of L-shaped angle iron strips of metal or simply cross-sectionally rectangular metal strips affixed to the roof 45 at a predetermined angle to the longitudinal axis of each rotor casing 29. Each individual rotor casing 29 is separated along the center line of the module 41 by the casing divider, indicated generally by the numeral 48. Appropriately fastened between the tops of each of the rotor casings 29 are a pair of bracket members 49 which are contiguous at their upper portion between the squared end retaining portions 50 of the tops of rotor casing 38. The sides of bracket member 49 are curved concavely to continue the arc of each rotor casing 29 downwardly from the roof 45. Dividing members 51 (only one of which is shown in FIG. 2) are suitable slidably fastened between the bottom portions of bracket members 48 to permit them to move up and down as the concaves are raised and lowered and to complete the arcuate dividing of the two rotor casings 29 into separate and distinct channels. On each of the exterior sides of the module 41 an appropriately curved side sheet 52 continues the arc of the rotor casing 29 downwardly. The generally cylindrical configuration of each of the rotor casings 29 is completed by the aforementioned concaves (not shown) which are generally contiguous with the bottom portions of side sheet 52 and dividing member 51.

The forwardmost portion of the rotor casing 29 has affixed to the underside of the roof 45 a flange member 54, seen in FIG. 2. Flange member 54 serves as a seal against the upper portion of the infeed housing 16 to prevent the escape of crop material from the rotor casing 29 during operation. The bottom portion of the rotor casing module 41 has a curved infeed ramp portion 55, see briefly FIG. 3, which guides the crop material upwardly from the infeed housing 15 into the individual rotor casings 29 and rotors 18, as seen in FIG. 2. As the crop material moves rearwardly into the casings 29, it is directed inwardly by the arcuate guide members (not shown) positioned at the lower interior and exterior portions of each of the casings 29.

Figure 4:
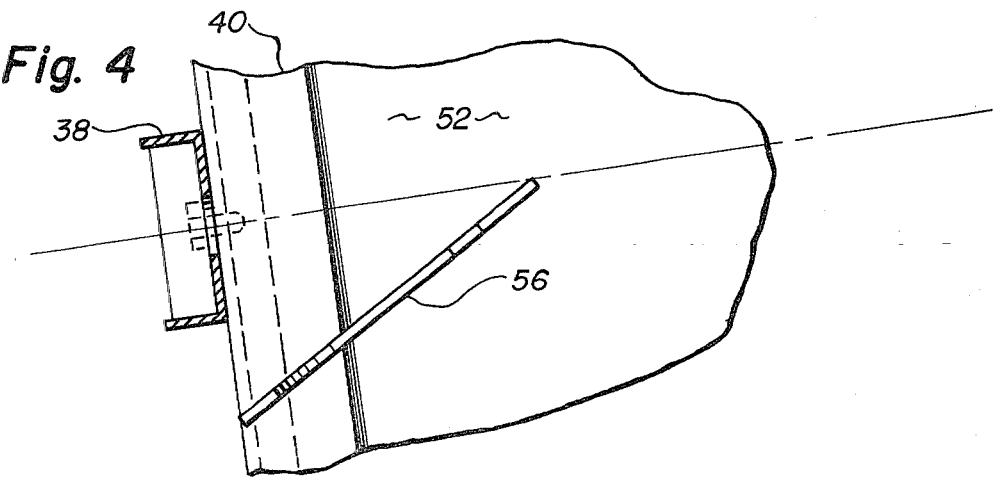
FIG. 4 is a partial side elevational view of the outer sidewall of the rotor casing taken along the section line 4—4 of FIG. 3.

The improved crop material guide means of the instant invention is shown partially in FIGS. 2, 3 and 4 in the form of stripper plates 56. As seen in FIG. 4, stripper plate 56 is fastened to the exterior side sheet 52 at the very forwardmost portion of the casing 29. The stripper plate is preferably mounted at a 45° angle to the horizontal to assist in guiding the crop material rearwardly. The plate 56 also prevents the stems of the crop material from moving upwardly towards the roof 46 of each casing 29 as the auger flightings 34 of each rotor 18 are rotated in opposing directions to impart a rearwardly spiralling motion to the crop material after it has initially entered the rotor casings 29. Each stripper plate 56 is tapered or contoured in shape as seen in FIG. 3 to conform closely to the path described by the periphery of the auger flightings 34 as they rotate. In this manner the crop material is stripped from the auger flightings 34 and forced rearwardly into each of the casings 29 until the crop material has passed sufficiently rearwardly into each casing 29 to be able to pass over the top of each rotor 18 without encountering the rotor shafts 36.

In operation the combine 10 moves across a field of crop material where the header 15 gathers crop material and consolidates it. The crop material is transferred from the header upwardly into the infeed area 31 by the crop elevator within the infeed housing 16. Since the crop material is fed into the infeed area 31 from beneath each of the shafts 36, or in an undershot manner, the stripper plates 56 mounted to the outer side sheet 52 of each rotor casing initially functions to prevent crop material from moving upwardly toward the rotor casing roof 46 and into contact with the rotating shafts 36. The plates 56 guide the crop material rearwardly into each casing 29, being tapered to conform to the path described by the periphery of the auger flightings 34 as the rotors 18 rotate within each rotor casing 29 start to impart circumferential motion to the crop material as it is spiralled rearwardly about each rotor 18. The auger flightings 34 at the very forwardmost portion of each rotor 18 initially engage the crop material and initiate this circumferential motion of the material about the rotor. The rearward spiralling of the auger causes the crop material to commence rearward movement within each casing 29. As the leading edge of the auger flightings 34 commences moving the crop material outwardly, the stripper plates 56 serve to strip or peel the crop material off of the flightings 34 until the crop material has moved sufficiently rearwardly of the stub shafts 36.

In this manner, crop material is prevented from wrapping about the front of each of the rotors at the rotor shafts 36. This crop material, once it is conveyed farther back into the rotor casings 29, is threshed and separated in the appropriate portions of the rotor 18 and the rotor casing 29 in a manner that is generally old and well known in the art.

While the preferred structure in which the principles of the present invention have been incorporated is shown and described above, it is to be understood that the invention is not to be limited to the particular details thus presented, but, in fact, widely different means may be employed in the practice of the broader aspects of this invention. The scope of the appended claims is intended to encompass all obvious changes in the details, materials and arrangements of parts which will occur to one of ordinary skill in the art upon a reading of this disclosure.

Having thus described the invention, what is claimed is:

1. In a crop harvesting and threshing machine having a mobile frame with a longitudinal axis, and at least one threshing and separating member having a first end and an opposing second end supported on the frame for rotation about an axis substantially parallel to the longitudinal axis by means including a shaft on the first end, a casing surrounding a substantial portion of the member, the casing including an upper portion and a lower portion having a discharge area adjacent the second end and an infeed area adjacent the first end, the casing further having an outer sidewall and an opposing inner sidewall, the member and the casing cooperating to direct crop material toward the second end from the first end, and drive means therefore, the improvement comprising:
said threshing and separating member including auger flighting attached thereto in the infeed area, the auger flighting further having a periphery which describes a predetermined path during rotation; and
crop guide means having a first edge connected to the outer sidewall and a second opposite edge protruding toward and terminating proximate with said flighting, said edge including a recess sufficient to substantially define said predetermined path.

2. The harvesting and threshing machine according to claim 1 wherein the stripping plate is further mounted to the outer sidewall at approximately a 45° angle to the horizontal.

3. In a crop harvesting and threshing machine with axial flow threshing and separation having:
a mobile frame;
a casing with an infeed area to receive crop material and a discharge area with a suitable outlet to dispose of the crop material residue defining therebetween a generally axial path, the casing further having an upper portion, an opposing lower portion, an inner sidewall and an opposing outer sidewall;
a rotatable threshing and separating member within the casing extending generally rearwardly from the infeed area to the discharge area having a front end and an opposing rear end, the front end having adjacent the infeed area auger flighting to impart radial movement to the crop material as it is spiralled rearwardly about the member;
shaft means protruding from the front end of the threshing and separating member adjacent the infeed area and about which the threshing and separating member is rotatably supported on the frame and driven;
drive means for rotating the threshing and separating members;
rasp bar means affixed to the threshing cylinder at predetermined spaced intervals;
separator means affixed to the threshing and separating member rearwardly of the rasp bar means and adjacent the discharge area for separating the grain from the residue;
a concave of predetermined length supported by the roller portion of the casing for cooperation with the rasp bar means thereby defining the threshing means;
a separating assembly of predetermined length supported by the lower portion of the casing and rearwardly of the concave cooperatively interacting with the separator means to thereby define the separating means;
inwardly projecting elongate crop material guide means fastened to the outer sidewall adjacent the infeed area cooperative with the threshing and separating member to direct crop material rearwardly towards the rear end to thereby prevent the crop material from moving initially upwardly towards the upper portion and prevent wrapping about the shaft means;
the auger flighting further having a periphery which describes a predetermined path during rotation; and
crop guide means having a first edge connected to the outer sidewall and a second opposite edge protruding toward and terminating proximate with said flighting, said edge including a recess sufficient to substantially define said predetermined path.

4. The harvesting and threshing machine according to claim 3 wherein the stripping plate is further mounted to the outer side wall at approximately a 45° angle to the horizontal.

5. In a harvesting and threshing machine having a mobile frame with a longitudinal axis, at least one rotatable threshing and separating member oriented substantially parallel to the longitudinal axis and having a longitudinally determined front end and an opposing rear end, a generally circular casing about the threshing and separating member including a top portion and an opposing bottom portion having an inner sidewall and an opposing outer sidewall, the casing further having an infeed area adjacent the front end, the bottom portion having openings of predetermined size to permit the threshed crop material to pass therethrough, shaft means rotatably supporting the threshing and separating member and being connected adjacent the front end and the rear end of the threshing and separating member to the frame, the shaft means adjacent the rear end of the threshing and separating member further being connected to a drive means, a series of spaced-apart crop material axial flow facilitating means affixed to the top portion of the casing, an area for threshing and separating crop material having a discharge area, the improvement comprising:

said threshing and separating member including auger flighting attached thereto in the infeed area, the auger flighting further having a periphery which describes a predetermined path during rotation; and crop guide means having a first edge connected to the outer sidewall and a second opposite edge protruding toward and terminating proximate with said flighting, said edge including a recess sufficient to substantially define said predetermined path.

6. The harvesting and threshing machine according to claim 5 wherein the stripping plate is further mounted to the outer sidewall at approximately a 45° angle to the horizontal.

* * * * *